(12) United States Patent
Iyer et al.

(10) Patent No.: US 9,645,819 B2
(45) Date of Patent: May 9, 2017

(54) METHOD AND APPARATUS FOR REDUCING AREA AND COMPLEXITY OF INSTRUCTION WAKEUP LOGIC IN A MULTI-STRAND OUT-OF-ORDER PROCESSOR

(75) Inventors: Jayesh Iyer, Bangalore (IN); Nikolay Kosarev, Yoshkar-Ola (IN); Sergey Shishlov, Moscow (RU); Alexey Sivtsov, Moscow (RU); Alexander Butuzov, Moscow (RU); Boris A. Babayan, Moscow (RU); Vladimir Penkovski, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1063 days.

(21) Appl. No.: 13/524,240

(22) Filed: Jun. 15, 2012

(65) Prior Publication Data
US 2013/0339679 A1 Dec. 19, 2013

(51) Int. Cl.
*G06F 9/38* (2006.01)
*G06F 9/30* (2006.01)

(52) U.S. Cl.
CPC ........ *G06F 9/30032* (2013.01); *G06F 9/3814* (2013.01); *G06F 9/3836* (2013.01); *G06F 9/3838* (2013.01); *G06F 9/3851* (2013.01); *G06F 9/3857* (2013.01)

(58) Field of Classification Search
CPC .................................................... G06F 9/3836
USPC .......................................................... 712/216
See application file for complete search history.

(56) References Cited

U.S. PATENT DOCUMENTS

| 6,260,135 | B1* | 7/2001 | Yoshida | 712/214 |
|---|---|---|---|---|
| 6,557,095 | B1* | 4/2003 | Henstrom | 712/216 |
| 7,464,253 | B2* | 12/2008 | Veidenbaum et al. | 712/216 |
| 7,861,063 | B1* | 12/2010 | Golla et al. | 712/214 |
| 2003/0140216 | A1* | 7/2003 | Stark et al. | 712/214 |
| 2007/0198812 | A1* | 8/2007 | Abernathy | G06F 9/3836 712/214 |
| 2009/0265527 | A1* | 10/2009 | Luick | 712/216 |
| 2009/0271592 | A1* | 10/2009 | Jensen | 712/214 |

* cited by examiner

*Primary Examiner* — Andrew Caldwell
*Assistant Examiner* — Michael Metzger
(74) *Attorney, Agent, or Firm* — Patent Capital Group (57) ABSTRACT

A computer system, a computer processor and a method executable on a computer processor involve placing each sequence of a plurality of sequences of computer instructions being scheduled for execution in the processor into a separate queue. The head instruction from each queue is stored into a first storage unit prior to determining whether the head instruction is ready for scheduling. For each instruction in the first storage unit that is determined to be ready, the instruction is moved from the first storage unit to a second storage unit. During a first processor cycle, each instruction in the first storage unit that is determined to be not ready is retained in the first storage unit, and the determining of whether the instruction is ready is repeated during the next processor cycle. Scheduling logic performs scheduling of instructions contained in the second storage unit.

30 Claims, 8 Drawing Sheets

METHOD AND APPARATUS FOR REDUCING AREA AND COMPLEXITY OF INSTRUCTION WAKEUP LOGIC IN A MULTI-STRAND OUT-OF-ORDER PROCESSOR

BACKGROUND INFORMATION

In computer processors, achieving a wide "execution width" (the maximum number of instructions that can be dispatched per cycle) requires efficient support for a very large "instruction scheduling window" (conceptually defined as the range from the oldest instruction which has been executed but not yet been retired to the youngest instruction that is being considered for execution).

The performance of general-purpose superscalar processors, with in-order fetch and out-of-order execution, is limited by under-utilization of instruction level parallelism (ILP) that characterizes the inherent parallelism of a program algorithm. Superscalar processors heavily rely on Out-Of-Order (OOO) dispatch/execution to exploit ILP. Since the program code is naturally sequential and instructions are fetched and decoded in-order in most superscalar machines, to allow the OOO dispatch, these machines first need to track data dependencies, use wakeup logic to check whether source operands are ready/available for each instruction, and only after the source operands are available, dispatch instructions OOO to execution units.

In most superscalar processors, after instructions are fetched and decoded in the processor's "Front End", they enter the instruction scheduling window, where they are allocated buffer resources such as a re-order buffer (ROB), reservation stations (RSs, also referred to as waiting buffers), load buffers and store buffers. The scheduler is where the OOO characteristics (dynamic scheduling) of superscalar machines are achieved. Three pieces of logic are needed to perform dynamic scheduling: rename logic, wakeup/tag comparison logic, and schedule logic.

After instructions have been renamed (e.g., using a register alias table to logically map architectural or logical registers to physical registers), they wait in a RS for their source operands to become available. Each RS entry contains information about an instruction's sources, such as the physical register identifier (tag) for the source, whether the source operand is ready, and the number of cycles it takes the producer (an instruction that resolves a dependency involving a register to allow issue of a consumer instruction that uses the register as a source operand) of the source's value to execute.

Since instructions may be dispatched OOO from the RS, register true dependencies such as read-after-write (RAW) must be detected and resolved. The wakeup logic (or tag comparison logic) checks for such dependencies and is responsible for waking up the instructions that are waiting in the RS for their source operands to become available. Each RS entry is allocated wakeup logic that wakes up the instruction stored in it. This tag comparison is usually implemented using content addressable memory (CAM) or techniques like dependency tracking matrices. Each instruction waiting in the RS will usually have two source operands, both of which need to be available for the instruction to be woken up (i.e., made ready to be considered for scheduling).

Figure 1:
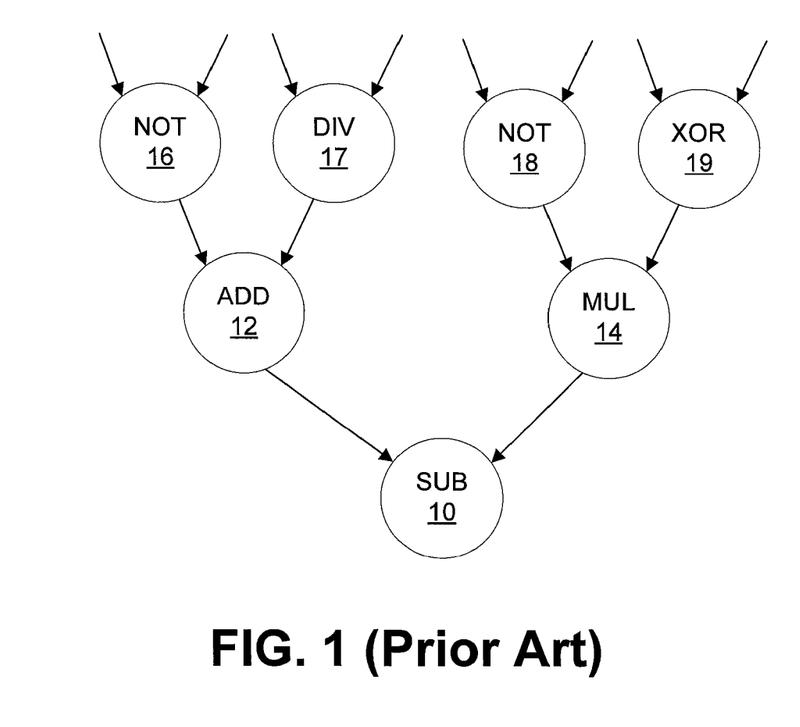
FIG. 1 illustrates a conventional data flow graph for a set of exemplary instructions.

FIG. 1 illustrates a data flow graph. SUB instruction 10 is dependent on its parent instructions (ADD 12 and MUL 14) for its source operands, i.e. it consumes the values produced by its parents and hence when it is allocated in RS, the SUB instruction 10 will have to wait for its source operands to become available (ADD 12 and MUL 14 will have to produce their results first). Producer instructions can include both single cycle instructions (e.g., ADD and SUB) as well as multi-cycle instructions (e.g., MUL and DIV). The producer instructions may also be consumers (ADD 12 is a consumer of NOT 16 and DIV 17, MUL 14 is a consumer of NOT 18 and XOR 19). Typically, when an instruction is dispatched (sent for execution), it will broadcast its destination tag on a "destination tag bus" (in FIG. 1, when ADD 12 & MUL 14 are dispatched, their respective destination tags will be broadcast).

Figure 2:
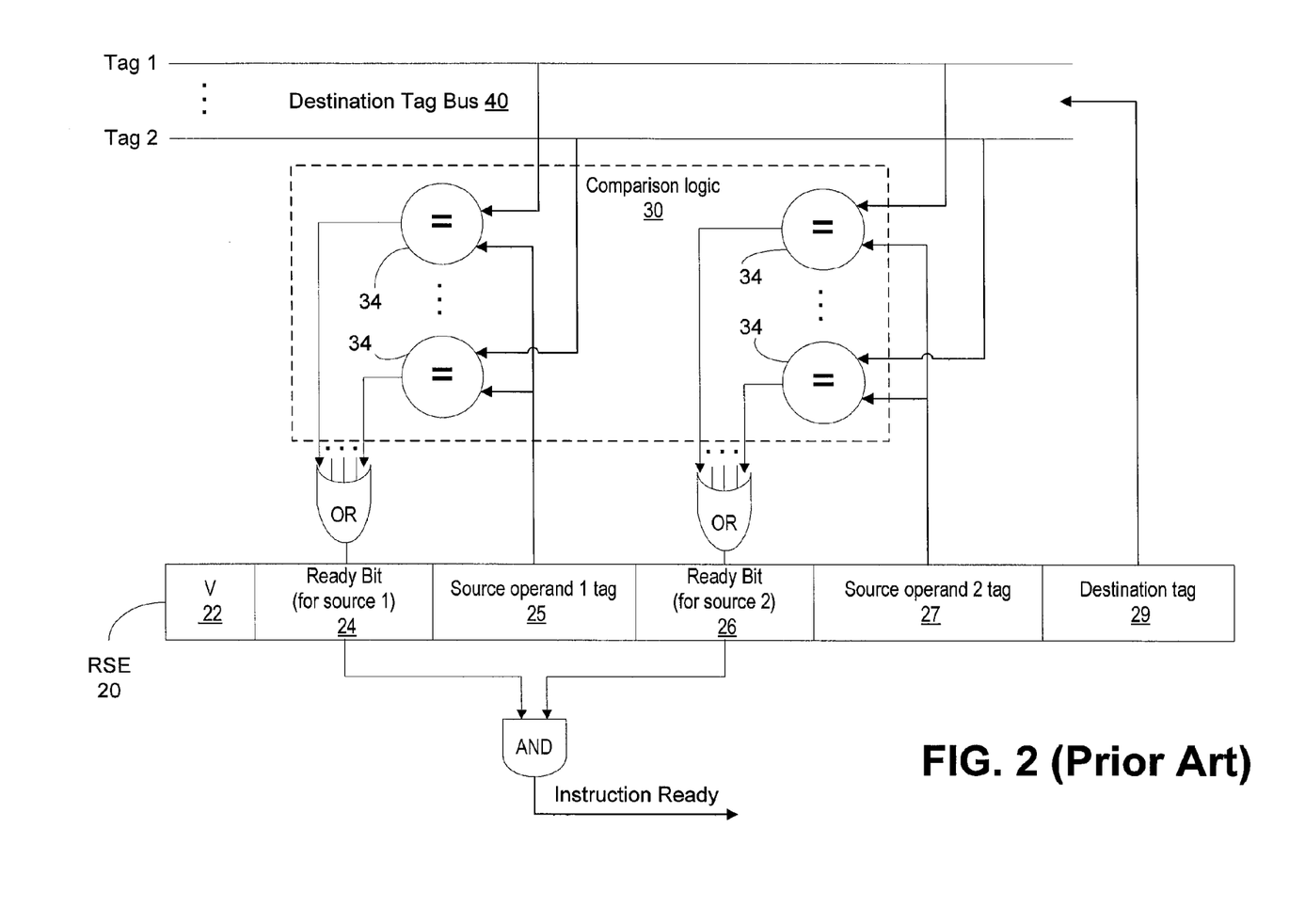
FIG. 2 illustrates wakeup logic for one reservation station entry in a superscalar processor.

FIG. 2 shows an example of wakeup logic for the source operands of one consumer residing in the reservation station in a superscalar processor. The wakeup logic includes a destination tag bus 40 that transmits the broadcasted tags to a comparison logic unit 30. Comparators 34 in the comparison logic unit 30 compare the broadcasted destination tags with the source operand tags of a consumer (e.g., source operand tag 25 and source operand tag 27 of a consumer instruction in an RS entry 20) and indicate if there is a match. Once both source tags are matched, the instruction is considered ready and an "instruction ready" signal is output. A valid bit 22 indicates whether the contents of RSE 20 are valid.

In today's superscalar architectures, the size of the instruction scheduling window directly or indirectly affects the size of hardware structures like RS (as well as ROB, register file, and load/store buffers). These hardware resources tend to scale linearly with the size of the instruction scheduling window. Also, there is an important empirical relationship between the instruction scheduling window size and sustainable execution width, which can be expressed as follows: $W \sim X^2$ to $X^4$, where W is the size of the instruction scheduling window and X is the sustainable execution width. Thus, the instruction scheduling window size scales at least quadratically with respect to execution width (i.e., in order to double execution width, the instruction scheduling window must be increased by a factor of 4 to 16, which means the size of the hardware structures like RS must also be increased by a factor of 4 to 16). Accordingly, a significant drawback of the approach in FIG. 2 is that the amount of wakeup logic hardware required scales at least quadratically with respect to execution width.

Additionally, in most superscalar processors, the wakeup logic works on all the entries in the RS. The schedule logic also works on all the RS entries and, based on a ready bit set by the wakeup logic, selects possible candidates (ready instructions) for dispatch along an execution port to an execution unit. Because each RS entry requires comparison logic hardware for waking up the instruction residing in the entry, the wakeup logic hardware will also grow at least quadratically with respect to execution width. This quadratic increase leads not only to an increase in the physical area of the instruction scheduling hardware, but also: leads to severe clock frequency/power implications; significantly limits the ability to increase execution width, and leads to processor performance slowdown if the area/timing/power issues are solved at the cost of performance (e.g., by applying microarchitecture logic and/or algorithms that are not optimized for performance to address these issues).

Processor architectures like TLS (Thread-level speculation) and DE (disjoint Eager Execution) use out-of-order fetch techniques to enlarge the instruction window by splitting program code into multiple threads of execution fetched out of order, but use wakeup logic similar to that used in superscalar processors, and therefore also suffer from quadratic scaling of wakeup logic hardware with respect to execution width. Other architectures, such as those used in various multiscalar processors (e.g., Pinot), mitigate the quadratic growth of wakeup logic by splitting execution resources into multiple processing elements connected in a ring structure. Execution width is increased by increasing the number of processing elements, without increasing ring interconnect bandwidth, leading to a linear growth in the wakeup logic. However, this approach is subject to ring bandwidth limits and also increases the latency with which operands are delivered between instructions executing on different processing elements.

Accordingly, a need exists for more efficient wakeup logic methods and corresponding hardware.

DETAILED DESCRIPTION OF EXAMPLE EMBODIMENTS

The present invention relates to methods and corresponding apparatuses for performing wakeup in a multi-strand OOO processor. Instructions in a multi-strand OOO processor are organized in strands. A multi-strand OOO processor is a machine that processes multiple strands (and instruction pointers) in parallel so that (1) instructions of a strand in respect to instructions of other strands are fetched, issued and executed out of program order; (2) instructions from each individual strand are fetched, issued and executed in the program order in respect to each other. A processor core in accordance with the present invention may be any one of a class of out-of-order fetch processors which are capable of fetching an instruction and considering it for execution before fetching preceding instructions. In one embodiment, wakeup logic is implemented in which instructions that are being considered for wakeup are processing differently than instructions that are being considered for scheduling.

Figure 3:
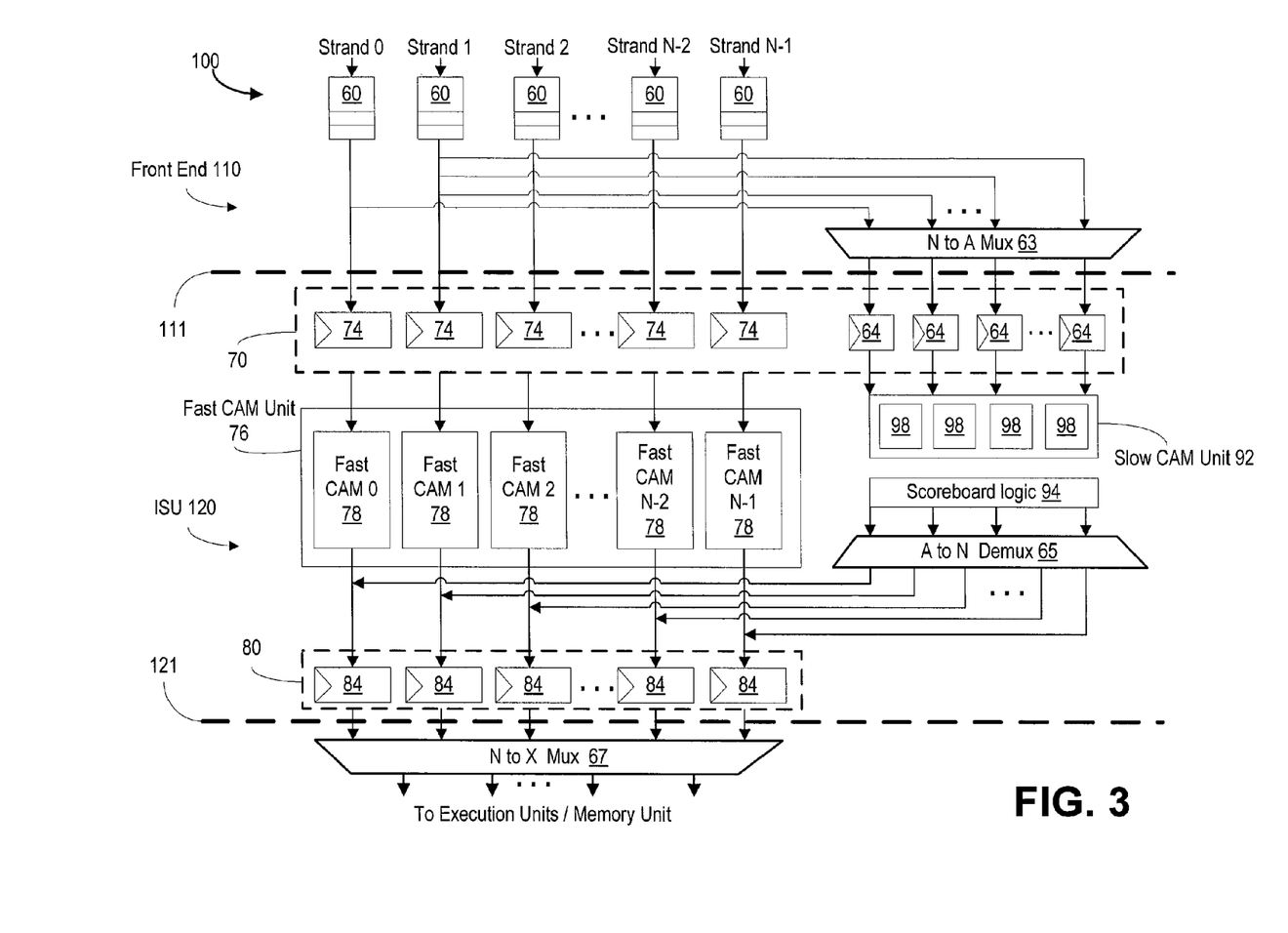
FIG. 3 illustrates a hardware arrangement for performing wakeup in a multi-scalar OOO processor according to one embodiment.

FIG. 3 illustrates wakeup logic located in an instruction scheduling unit (ISU) 120 of a multi-strand OOO processor according to one embodiment. In addition, FIG. 3 also illustrates a Front End 110, which is shown as a set of hardware elements above dashed line 111 and may include a set of buffers 60 and an N-to-A multiplexer 63.

The Front End 110 may fetch and decode instructions of a program in such a way that each strand is fetched and decoded in program order, while instructions from different strands can outrun instructions from other strands in terms of program order. In a multi-strand OOO processor, the instruction that is written into a hardware resource in a particular clock cycle is referred to as the head instruction of the strand, while subsequent instructions of the same strand that will occupy the hardware resource in one of the following clock cycles are referred to as following instructions. Decoded instructions may be placed in the buffers 60, with a single buffer 60 being allocated for buffering the instructions of each strand. In FIG. 3, there are N strands and therefore N buffers 60. The buffers 60 may be implemented as conventional First-In-First-Out (FIFO) queues.

The multiplexer 63 receives N head instructions and selects A head instructions for forwarding to a first storage unit 70 in the ISU 120, where A corresponds to the number of newly allocated instructions per cycle (a newly allocated instruction is one which has just moved into the head instruction position in the current cycle).

The ISU 120 includes two levels of storage units 70 and 80. The first level includes a storage unit 70 with N storage elements 74 and A storage elements 64. Each cycle, the A newly allocated head instructions are sent as input to the first storage unit 70 and written to A corresponding storage elements 64, as well as written to A corresponding storage elements 74. The second level includes a second storage unit 80 that contains N storage elements 84. The storage units 70/80 may be implemented using flip-flops or any other storage element, each of which latches a corresponding instruction in each clock cycle. The operation of the storage units 70/80 is explained below.

The first storage unit 70 and the second storage unit 80 together form a hardware structure that may be considered analogous to (but functionally and structurally different from) a waiting buffer or RS in a superscalar processor. For example, the storage units 70/80 hold instructions that are awaiting scheduling. However, in contrast to the waiting buffer or RS, the storage units 70/80 are arranged as a two level structure (with a first level formed by the storage unit 70, and a second level formed by the storage unit 80) that distinguishes between instructions which are not ready (waiting for source operands) and instructions which are ready, but waiting to be scheduled.

Each head instruction may be written into the first storage unit 70 and each cycle, one or more entries of the first storage unit 70 may be checked for operand readiness using wakeup logic, thereby enabling OOO execution of instructions from different strands. Additionally, newly allocated instructions may also be written to the storage elements 64 of the first storage unit 70. Therefore, storage elements 74 include all head instructions, whereas storage elements 64 include only newly allocated instructions.

If the wakeup logic determines that an instruction is ready, the instruction is moved into an entry in the second storage unit 80 and its corresponding entry in the first storage unit 70 becomes occupied in the next cycle by the following instruction from the same strand (i.e., a new head instruction is allocated and written into the first storage unit 70). However, if the wakeup logic determines that the instruction is not ready, the instruction will remain as the head instruction of its respective buffer 60 and therefore retains its entry in the first storage unit 70 so that in the next cycle, its readiness will be checked by the wakeup logic again. In this manner, instructions that are not yet ready are stored in the first storage unit 70, while instructions that are ready but waiting to be scheduled are stored in the second storage unit 80.

The wakeup logic may include a Fast CAM unit 76 and a Slow CAM unit 92. The Fast CAM unit 76 may include a set of CAMs 78, one for each of the N entries in the N storage elements 74 of the first storage unit 70. The Slow CAM unit 92 may include a set of CAMs 98, one for each of the A entries in the A storage elements 64 in the first storage unit 70. The Slow CAM unit 92 works in conjunction with a scoreboard logic unit 94, which may implement a scoreboard algorithm to resolve data dependencies, for example, the scoreboard algorithm described in U.S. patent application Ser. No. 13/175,619, filed on Jul. 1, 2011. An A-to-N demultiplexer 65 connects output from the combined Slow CAM unit 92 and scoreboard logic 94 to the second storage unit 80, e.g., through a set of signal lines that are also connected to corresponding outputs of the Fast CAM unit 76. Since there are N CAMs 74 and A CAMs 64, the total number of CAMs used in the comparison portion of the wakeup logic is equal to A+N. The operation of the wakeup logic and its various components will be described in further detail below in connection with FIGS. 4 to 6.

Ready instructions contained in the second storage unit 80 are processed by scheduling logic (not shown), which may perform conventional scheduling functions, e.g., selecting X ready instructions for dispatch to corresponding execution units through a set of execution ports. The X instructions may be selected based on instruction priority, execution port availability, and other scheduling factors. An N-to-X multiplexer 67 may be provided to receive and forward the X selected instructions to the execution ports. When an instruction is dispatched the instruction may broadcast its destination tag to each of its consumer instructions, e.g., over a destination tag bus similar to the bus 40 in FIG. 2.

Figure 4:
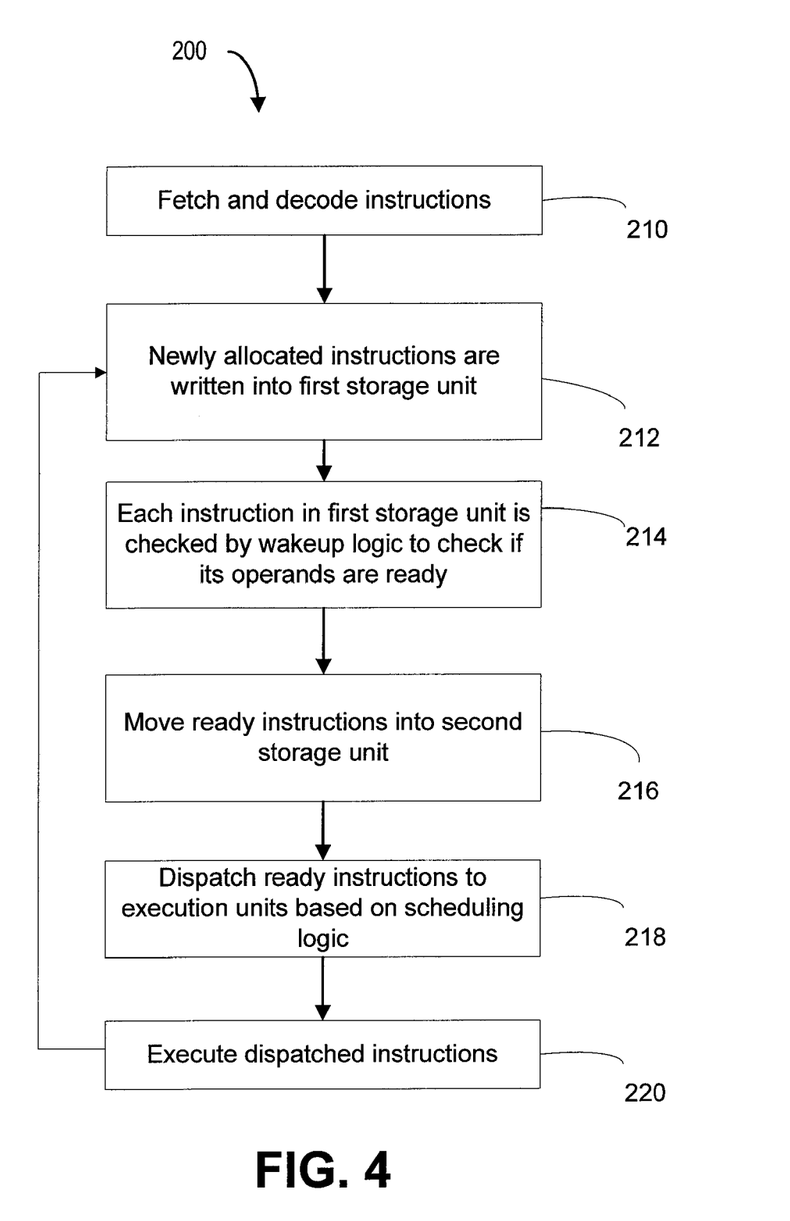
FIG. 4 illustrates a method for performing wakeup in a multi-scalar OOO processor according to one embodiment.

FIG. 4 illustrates a method 200 for performing wakeup in a multi-scalar OOO processor according to one embodiment. The method 200 is described in conjunction with the wakeup arrangement 100 in FIG. 3. However, the method 200 may also be practiced on other hardware arrangements that include wakeup logic in accordance with the embodiments of the present invention.

At 210, a processor Front End may fetch and decode instructions that are organized into strands.

At 212, newly allocated instructions may be written into corresponding entries in storage elements 64 and 74 in the first storage unit 70.

At 214, each instruction in first storage unit is checked by the wakeup logic to check if its operands are ready.

Figure 5:
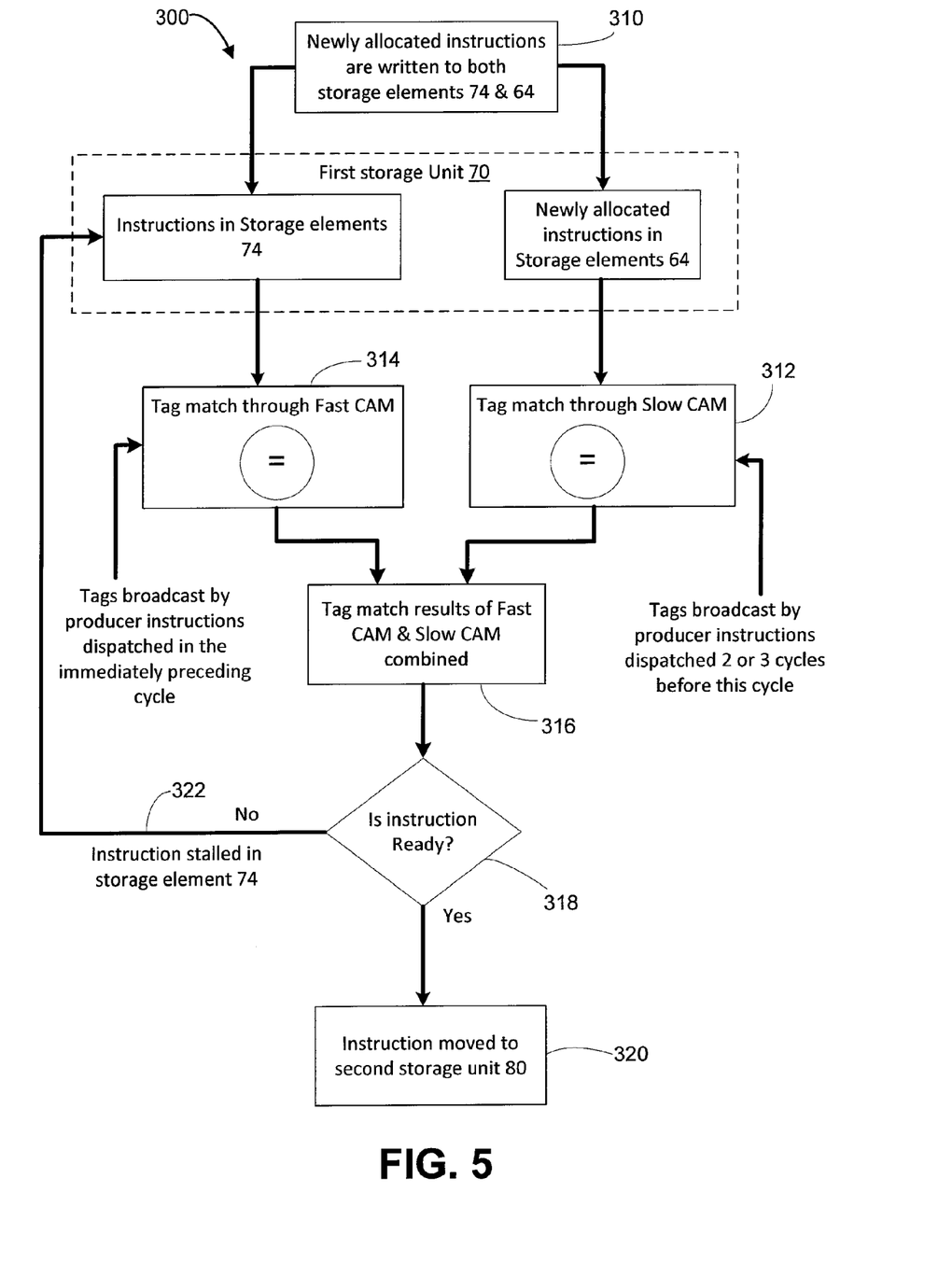
FIG. 5 illustrates a method for determining instruction readiness for use in conjunction with the method of FIG. 4, according to one embodiment.

Referring now to FIG. 5, a method 300 for determining instruction readiness may be used in conjunction with the wakeup logic of FIG. 3 to perform the determination in 214 of the method 200 in FIG. 4.

Every cycle new instructions will be allocated or written to storage elements 74 and storage elements 64 of first storage unit 70 (310). The CAMs 98 in the Slow CAM unit 92 may perform tag comparison to check whether the source operands for the instructions in storage elements 64 are ready to determine instruction readiness in conjunction with the scoreboard logic unit (not shown in FIG. 5). Readiness may be checked in each of the CAMs 98 by comparing the source tags of the instruction in the CAM 98 to the destination tag of any instruction that was dispatched earlier (e.g., 2 to 3 cycles prior to the current cycle, corresponding to all pipestages after dispatch up to and including a pipestage immediately before execution) from the second storage unit 80 to an execution unit (312). Also at the same time the CAMs 78 in the Fast CAM unit 76 may perform tag comparison to check whether the source operands for the instructions, both newly allocated as well as instructions stalled from previous cycles, in storage elements 74 are ready (314). A stalled instruction is one that was previously determined to be unready, and therefore remaining in the head instruction position from a previous cycle so as to continue occupying an entry in the storage elements 74 in the first storage unit 70. Readiness may be checked in each of the CAMs 78 of Fast CAM unit 76 through a tag comparison with tags that are broadcast by producer instructions in the immediately preceding cycle.

The results of the tag comparison from both Fast CAM unit 76 and slow CAM unit 92, in conjunction with a scoreboard logic result will be combined (316) to determine if both sources of an instruction are ready and hence whether an instruction is ready (318). The ready instructions may then be moved to the second storage unit 80 (320).

If the instruction is determined to be unready, it will remain in the head instruction position and will continue to occupy an entry in the storage elements 74 in the first storage unit 70 (322). In this case, in the next cycle the readiness of this instruction is checked only by the Fast CAM unit 76 (314). Thus, the Fast CAM unit 76 facilitates back-to-back wakeup for both newly allocated instructions as well as instructions that are stalled, so that ready instructions are quickly moved from the first storage unit 70 to the second storage unit 80, as soon as possible after the corresponding producer instructions are dispatched.

In contrast to the Slow CAM unit 92 which may operate on producer tags from 2 or 3 cycles earlier, the Fast CAM unit 76 gets the tags of the most recent producer instruction. As the most recent results are what should be used by any consumer instruction, for wakeup purposes, the readiness indicated by the Fast CAM unit 76 takes precedence over any similar readiness indicated by the Slow CAM unit 92 for the same consumer instruction and in the same cycle.

Additionally, for all instructions in the storage elements 74, including newly allocated instructions, whose producers are long latency instructions (e.g., multiplication, division, etc.), the readiness of these instructions is also checked by Fast CAM unit 76 (not shown in FIG. 5). Thus, the Fast CAM unit 76 also facilitates wakeup for instructions dependent on long latency producer instructions.

It will be appreciated that by using different structures (e.g., the Fast CAM unit 76 and the Slow CAM unit 92) that compare tags broadcast from different pipestages to facilitate wakeup, the hardware required for performing comparisons may be reduced. For example, the Slow CAM unit 92 checks tags broadcast from a greater number of pipestages compared to the Fast CAM unit 76, but for only a subset of instructions in the first storage unit 70 which are newly allocated and hence only once in the lifetime of the instruction, i.e. only A newly allocated instructions instead of all N head instructions. However, in other embodiments, it may be possible to use a single set of CAMs to perform readiness determination while maintaining a two level storage structure (i.e., storage units 70 and 80).

Figure 6:
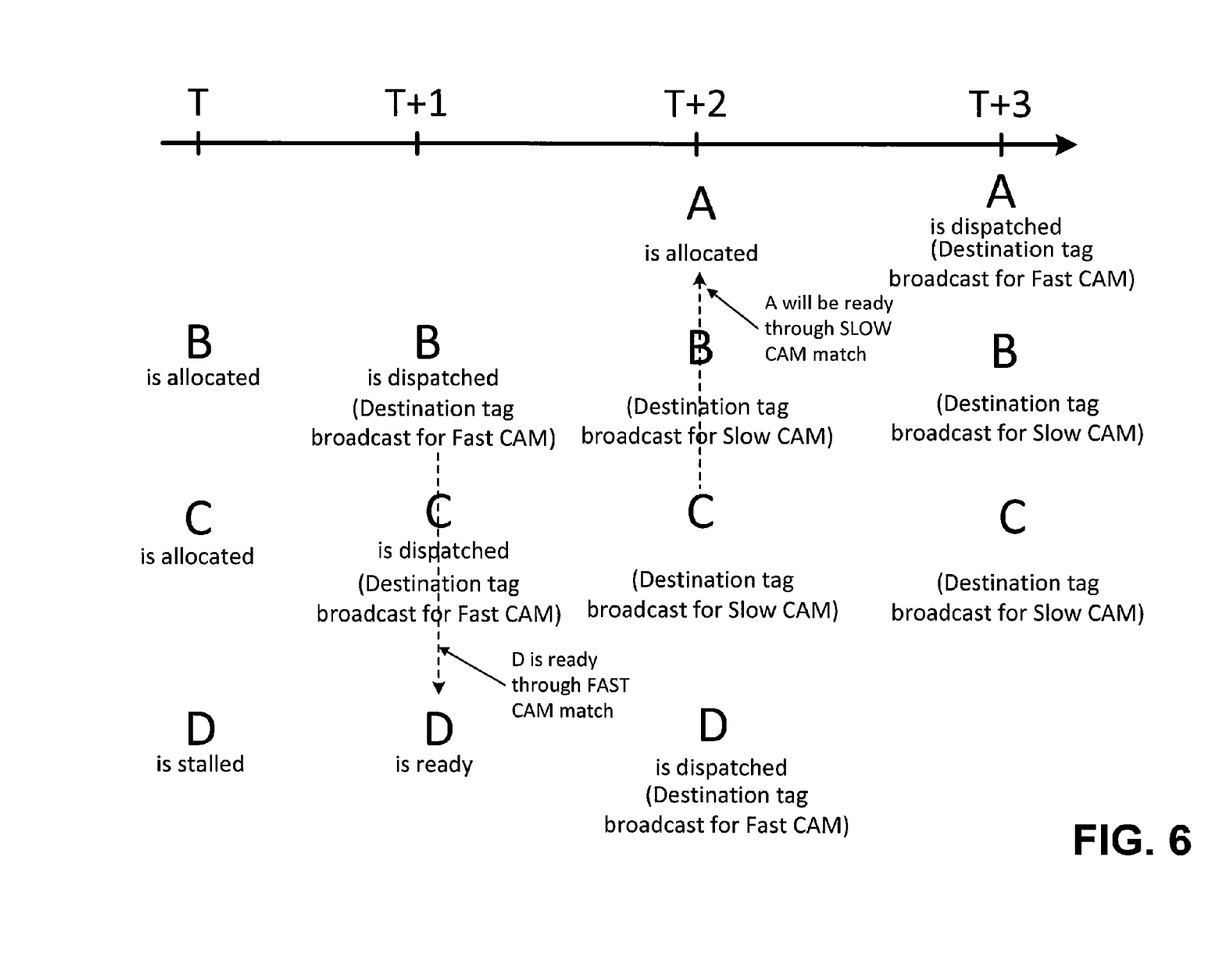
FIG. 6 is an example of a pipelined set of instructions that are processed in accordance with the method of FIG. 5.

FIG. 6 is an example of a pipelined set of instructions that illustrate how instructions may be processed in accordance with the method 300 of FIG. 5. In FIG. 6, there are four instructions A, B, C and D. Instruction A is a newly allocated instruction (let us say at cycle T+2). Now assume there is an instruction D that has been stalled since two cycles prior to cycle T (as one of its sources depends on the result of instruction B, which had not been dispatched at the time instruction D was allocated) in the first storage unit 70. Now assume that instruction B and instruction C were allocated into the first storage unit 70 two cycles earlier than instruction A (i.e. cycle T). Assume also that instruction C is a producer for instruction A. Further, assume that instruction B and instruction C were considered ready and were both dispatched (sent from the ISU 120 to an execution unit) in cycle T+1.

Based on the discussion of the method 300 above, let us consider first the case of instruction D which is stalled in the storage elements 74 of the first storage unit 70. In cycle T+1, when instruction B is dispatched, it will broadcast its destination tag, which will be compared by all the Fast CAM elements 78 of the Fast CAM unit 76 (as previously mentioned, the Fast CAM unit 76 compares destination tags broadcast by instructions from the immediately preceding cycle, in this case instruction B's destination tag). Thus, in cycle T+1, one of the Fast CAM elements 78 corresponding to the storage element 74 in which instruction D is residing will indicate a tag match (as the result produced by the instruction B is one of the sources of instruction D) and assuming the second source of instruction D has also been tag matched by the Fast CAM element 78, instruction D will be considered ready and moved to the second storage unit 80.

Now, in cycle T+2 instruction A gets allocated and will read scoreboard unit 94 as well as have its source tags compared by Slow CAM unit 92 with tags broadcast by instructions dispatched in cycle T and cycle T+1 (e.g., instruction C and instruction B). One of the Slow CAM elements 98 of the Slow CAM unit 92 corresponding to the storage element 64 in which instruction A is residing, will indicate a tag match (as the result produced by the instruction C is one of the sources of instruction A). If the other source of A is also ready (either through scoreboard or tag match by the Slow CAM unit 92 or tag match by the Fast CAM unit 76), instruction A will be considered ready and moved to the second storage unit 80, otherwise it will be stalled in the first storage unit 70 and will be considered for wake up again in the next cycle, but this time only by Fast CAM elements 78 of the Fast CAM unit 76.

Based on the discussion above, it is apparent that the Fast CAM unit 76 may take the destination tags of all instructions that were dispatched in the previous cycle, and compare the destination tags to the source tags of both newly allocated instructions (e.g., A) and stalled instructions (e.g., D). Instruction B broadcasts its destination tag when B is ready and scheduled (e.g., during dispatch in cycle T+1).

Additionally, as instruction B is the producer producing the result which is used by D, the Fast CAM unit 76, based on tag comparison, will indicate a tag match and if the other source of instruction D is also ready through some other tag match not shown, instruction D will be considered as ready.

As for instruction C, its destination tag is forwarded to Fast CAM unit 76 in cycle T+1 and to the Slow CAM unit 92 in cycles T+2 and T+3. In cycle T+2, the Slow CAM unit 92 will compare the destination tag of C being broadcast with source tags of all newly allocated instructions (e.g., instruction A) and will indicate a tag match with the source tag of instruction A and, as discussed above, if the other source of instruction A is also ready (through scoreboard or some other tag match not shown), instruction A will be considered ready.

Returning to FIG. 4, at 216 any instruction that was determined to be ready is moved into the second storage unit 80. Instructions in the second storage unit 80 do not require any wakeup logic, as they are considered to be awake at this point.

At 218, the ready instructions contained in the second storage unit 80 may be dispatched to execution units based on a scheduling procedure performed by the scheduling logic. The scheduling logic may control the multiplexer 67 to select X ready instructions for dispatch based on, for example, port availability or instruction priority.

At 220, the dispatched instructions may be executed at the execution units.

Figures 7A, 7B:
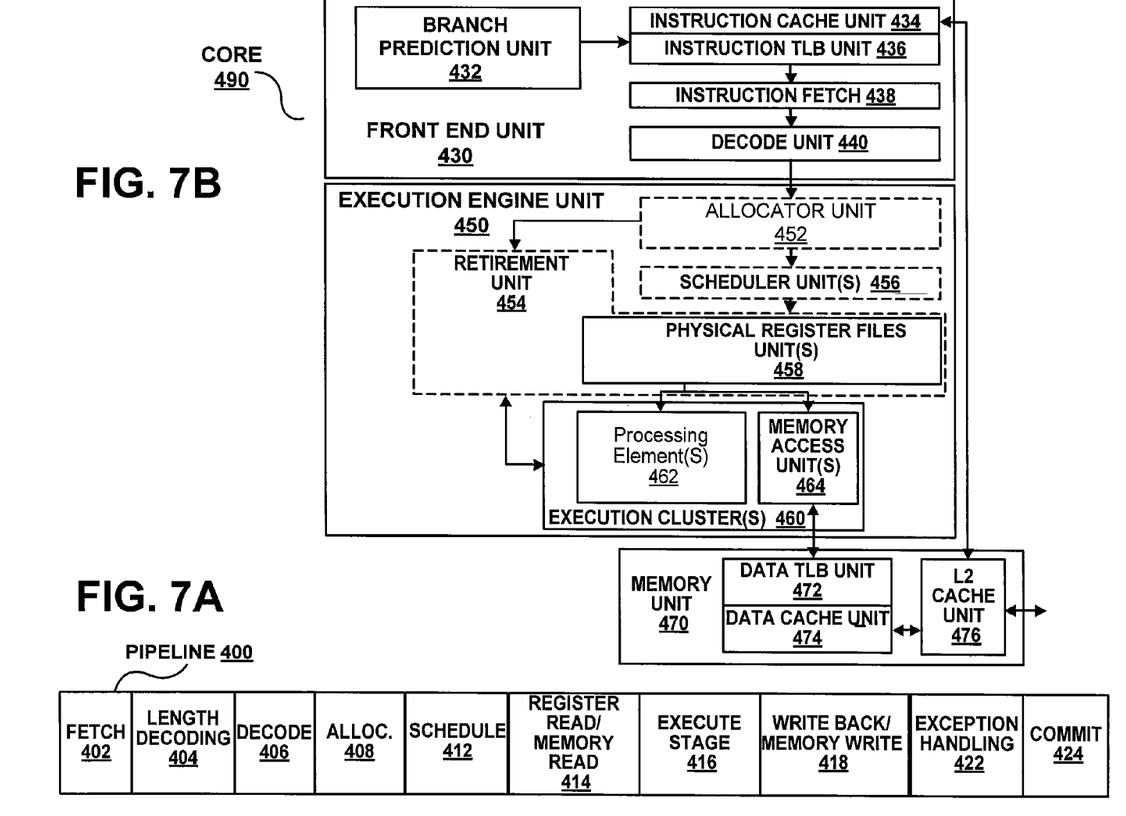
FIG. 7A illustrates elements of a processor execution pipeline according to one embodiment.
FIG. 7B illustrates elements of a processor micro-architecture according to one embodiment.

FIG. 7A is a block diagram illustrating an execution pipeline according to at least one embodiment of the invention. FIG. 7B is a block diagram illustrating a multi-strand OOO architecture core having an out-of-order issue/execution logic to be included in a processor according to at least one embodiment of the invention.

In FIG. 7A, an execution pipeline 400 includes a fetch stage 402, a length decode stage 404, a decode stage 406, an allocation stage 408, a scheduling (also known as a dispatch or issue) stage 412, a register read/memory read stage 414, an execute stage 416, a write back/memory write stage 418, an exception handling stage 422, and a commit stage 424. Although each strand, taken individually, may be fetched, decoded and executed in-order, strands may be fetched and/or executed out-of-order relative to each other.

In FIG. 7B, arrows denote a coupling between two or more units and the direction of the arrow indicates a direction of data flow between those units. FIG. 7B shows processor core 490 including a front end unit 430 coupled to an execution engine unit 450, and both are coupled to a memory unit 470.

The core 490 may be any computing core that supports multi-strand OOO execution of instructions.

The front end unit 430 may include a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to an allocator unit 452 in the execution engine unit 450.

The execution engine unit 450 includes the allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers, combinations of dedicated and dynamically allocated physical registers, etc. The retirement unit 454 and the physical register file(s) unit(s) 458 are coupled to the execution cluster(s) 460. The execution cluster(s) 460 includes a set of one or more processing elements 462 and a set of one or more memory access units 464. The processing elements 462 may perform various operations (e.g., shifts, addition, subtraction, multiplication) and on various types of data (e.g., scalar floating point, packed integer, packed floating point, vector integer, vector floating point). While some embodiments may include a number of processing elements dedicated to specific functions or sets of functions, other embodiments may include only one processing element or multiple processing elements that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary out-of-order issue/ execution core architecture may implement the pipeline 400 as follows: 1) the instruction fetch 438 performs the fetch and length decoding stages 402 and 404; 2) the decode unit 440 performs the decode stage 406; 3) allocator unit 452 performs the allocation stage 408; 4) the scheduler unit(s) 456 performs the schedule stage 412; 5) the physical register file(s) unit(s) 458 and the memory unit 470 perform the register read/memory read stage 414; the execution clusters 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
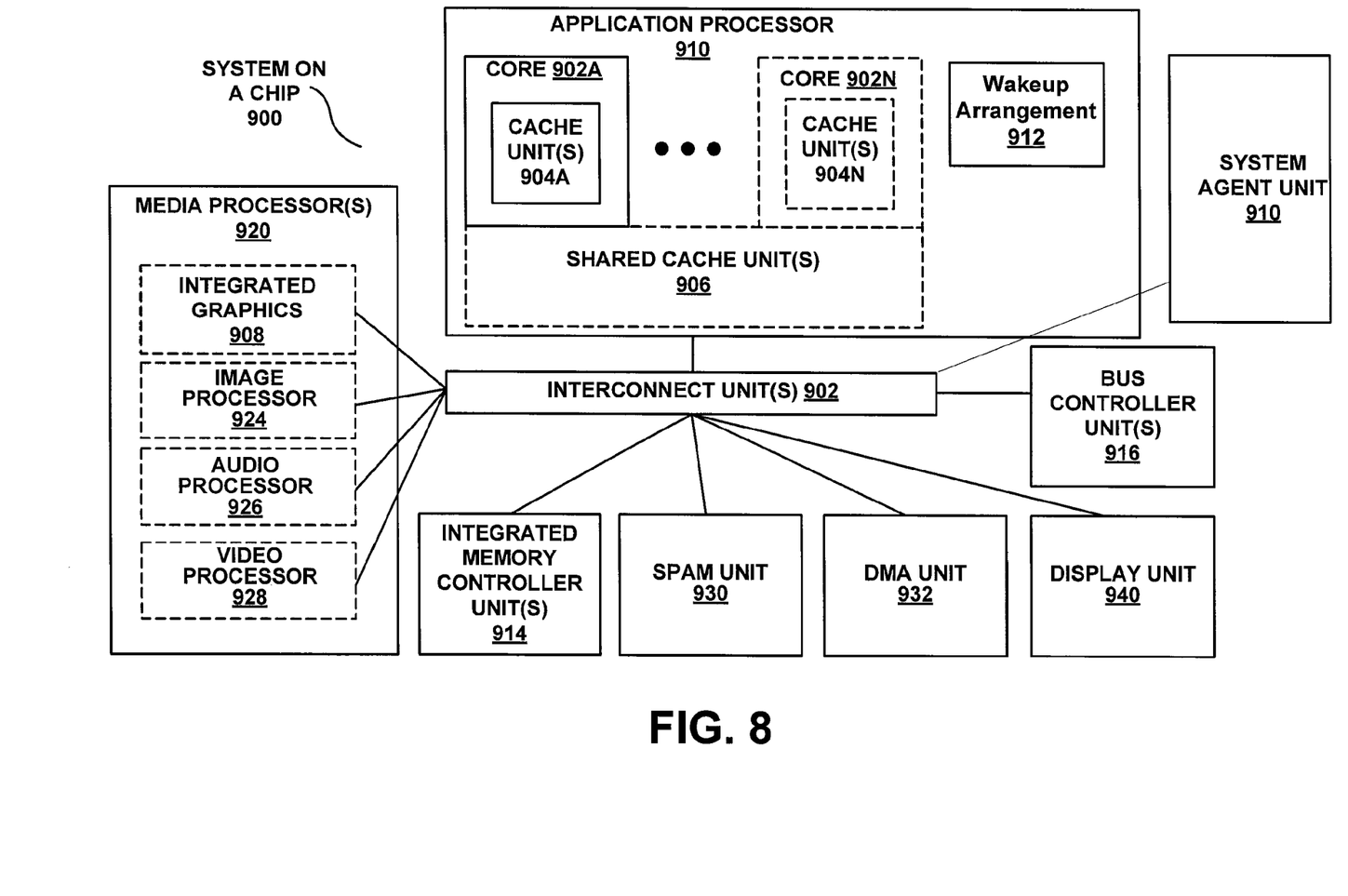
FIG. 8 is a block diagram of a system-on-a-chip according to one embodiment.

FIG. 8 is a block diagram of a system on a chip (SoC) 900 in accordance with an embodiment of the present invention. In FIG. 8, an interconnect unit(s) 902 is coupled to: a multi-strand OoO application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The application processor 910 may also include a wakeup arrangement 912, such as the wakeup arrangement 100 in FIG. 3.

As mentioned above and apparent from FIG. 3, the number of wakeup logic hardware resources (i.e., CAMs) is equal to A+N, where N is the number of first storage elements 74 in the first storage unit 70 and each storage element has its own Fast CAM element 78 in the Fast CAM unit 76, while A is the number of newly allocated instructions and hence the number of second storage elements 64 in the first storage unit 70, with each storage element 64 having its own Slow CAM element 98 in the Slow CAM unit 92. Based on detailed simulations performed using kernels representative of standard CPUSPEC benchmarks, the inventors of the present invention have discovered that the optimal value of N when X=3 is N=12; when X=4 is N=16 and when X=8 is N=32. Additionally, it was discovered that the optimal value for A is A=X. Thus, 15 CAMS are required when X=3; CAMs are required when X=4 and 40 CAMs are required when X=8. The amount of wakeup logic hardware resources therefore grows linearly with respect to execution width, in contrast to the quadratic scaling in superscalar machines. Thus, the amount of wakeup logic hardware resources required, e.g., to achieve an execution width X of 4 or higher, is substantially reduced compared to superscalar machines. The embodiments of this invention thus help to reduce the overall area of the dynamic scheduler and help to overcome the resource scaling issues with respect to execution width seen in superscalar processors.

The embodiments of the present invention also achieve better utilization of CAM hardware, by virtue of splitting the wakeup logic into Fast CAM and Slow CAM units, with each unit checking the readiness of only instructions in particular storage elements and with destination tags broadcast from different pipestages (e.g. the Fast CAM unit 76 checks readiness of both newly allocated instructions as well as instructions which are stalled in first storage elements 74, using destination tags broadcast only from the pipestage in which instructions are actually dispatched; while the Slow CAM unit 92 checks readiness of only newly allocated A instructions, using destination tags broadcast from the pipestage after dispatch to the pipestage before execution).

The embodiments of the present invention also achieve a more efficient utilization of the CAM hardware, in terms of area, by only considering half of the reservation station or waiting buffer entries for CAM based wakeup by moving ready instructions from first storage unit 70 to the corresponding second storage unit 80 (e.g. instructions in the reservation station which have been considered ready but NOT YET scheduled do not get considered for CAM based wakeup).

The example embodiments of the present invention also provide advantages over other types of processors. For example, the wakeup logic grows linearly without imposing limitations on operand delivery latency and bandwidth, as opposed to the wakeup logic used in multiscalar/Pinot architectures.

Although the above examples describe instruction handling and distribution in the context of execution units and logic circuits, other embodiments of the present invention can be accomplished by way of data or instructions stored on a non-transitory, machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be presented combined with each other in various combinations. The specification and drawings are accordingly to be regarded in an illustrative rather than restrictive sense.

What is claimed is:

1. A computer system, comprising:
   a computer processor configured to perform the following:
   placing each sequence of a plurality of sequences of computer instructions being scheduled for execution in a computer processor into a separate queue;
   storing a head instruction from each queue into a first set of storage elements of a first storage unit
   storing any instruction that has just moved into the head position of a respective queue into a second set of storage elements of the first storage unit;
   determining whether the instructions in the first storage unit are ready for scheduling, wherein the readiness of instructions in the first set of storage elements is determined using destination tags from producer instructions in an immediately preceding processor cycle, and wherein the readiness of instructions in the second set of storage elements is determined using destination tags from producer instructions in cycles that are earlier than the immediately preceding processor cycle;
   for each instruction in the first storage unit that is determined to be ready, moving the instruction from the first storage unit to a second storage unit in which the instruction is stored until selected for dispatch to an execution unit;
   during a first processor cycle, for each instruction in the first set of storage elements that is determined to be not ready, retaining the instruction in the first set of storage elements and repeating the determining of whether the instruction is ready during the next processor cycle; and
   applying scheduling logic to perform scheduling of instructions contained in the second storage unit, wherein the scheduling selects a subset of the instructions in the second storage unit for dispatch.

2. The computer system of claim 1, wherein the processor is a multi-strand out-of-order processor configured to execute each sequence of the plurality of sequences as a separate strand.

3. The computer system of claim 1, wherein the processor is further configured to perform:
   during each processor cycle, storing each head instruction into a corresponding storage element in the first set of storage elements and each instruction that has just moved into the head position of a respective queue into a corresponding storage element in the second set of storage elements; and
   applying wakeup logic to the first storage unit to determine whether each head instruction stored in the first storage unit is ready.

4. The computer system of claim 3, wherein:
   the wakeup logic is split into a first portion and a second portion;
   the first portion and the second portion each compare destination tags broadcast by producer instructions, including both single cycle as well as multi-cycle instructions; and
   the first portion and the second portion collectively compare destination tags from different pipestages starting from a pipestage in which instructions are dispatched for execution up to and including a pipestage immediately before execution.

5. The computer system of claim 4, wherein the processor is further configured to perform:
applying the first portion of the wakeup logic to the first set of storage elements to determine the readiness of instructions contained in the first set of storage elements, which include, in addition to instructions that have just moved into a head position of a respective queue, instructions that remain in the head position as a result of being stalled from a previous cycle.

6. The computer system of claim 5, wherein the processor is further configured to perform:
storing the instructions that have just moved into the head position of a respective queue into the second set of storage elements in the first storage unit, without storing the instructions that remain in the head position as a result of being stalled from a previous cycle; and
applying the second portion of the wakeup logic to the second set of storage elements to determine whether each instruction in the second set of storage elements is ready.

7. The computer system of claim 6, wherein:
the first portion of the wakeup logic compares destination tags broadcast from the pipestage in which instructions are dispatched for execution.

8. The computer system of claim 7, wherein:
the second portion of the wakeup logic compares destination tags broadcast from pipestages following the pipestage in which instructions are dispatched for execution, up to and including the pipestage immediately before execution.

9. The computer system of claim 6, wherein a number of storage elements in the second set of storage elements is equal to an allocation width of the processor.

10. The computer system of claim 8, wherein:
for each instruction that has just moved into the head position of a respective queue, a readiness indicated by the first portion of the wakeup logic takes precedence over a readiness indicated by the second portion of the wakeup logic.

11. The computer system of claim 4, wherein the first storage unit and the second storage unit are implemented using flops as storage elements, and the first portion of the wakeup logic and the second portion of the wakeup logic are implemented as content addressable memories.

12. A computer processor, comprising:
a front end section configured to place each sequence of a plurality of sequences of computer instructions being scheduled for execution in the processor into a separate queue;
a first storage unit including a first set of storage elements and a second set of storage elements, wherein the first set of storage elements store a head instruction from each queue, and wherein the second set of storage elements store any instruction that has just moved into the head position of a respective queue;
a wakeup logic arrangement configured to determine whether instructions in the first storage unit are ready for scheduling and to move ready instructions from the first storage unit to a second storage unit in the processor, wherein the readiness of instructions in the first set of storage elements is determined using destination tags from producer instructions in an immediately preceding processor cycle, wherein the readiness of instructions in the second set of storage elements is determined using destination tags from producer instructions in a plurality of cycles that are earlier than the immediately preceding processor cycle, wherein the ready instructions are stored in the second storage unit until selected for dispatch to an execution unit, wherein for each instruction in the first set of storage elements that is determined to be not ready, the processor retains the instruction in the first set of storage elements; and
scheduling logic configured to perform scheduling of instructions contained in the second storage unit, wherein the scheduling selects a subset of the instructions in the second storage unit for dispatch.

13. The processor of claim 12, wherein the processor is a multi-strand out-of-order processor configured to execute each sequence of the plurality of sequences as a separate strand.

14. The processor of claim 12, wherein:
during each processor cycle, the processor stores each head instruction into a corresponding storage element in the first set of storage elements and each instruction that has just moved into the head position of a respective queue into a corresponding storage element in the second set of storage elements; and
the wakeup logic arrangement is applied to the first storage unit to determine whether each instruction stored in the first storage unit is ready.

15. The processor of claim 14, wherein:
the wakeup logic arrangement is split into a first portion associated with the first set of storage elements and a second portion associated with the second set of storage elements;
the first portion and the second portion each compare destination tags broadcast by producer instructions, including both single cycle as well as multi-cycle instructions; and
the first portion and the second portion collectively compare destination tags from different pipestages starting from a pipestage in which instructions are dispatched for execution up to and including a pipestage immediately before execution.

16. The processor of claim 15, wherein:
the first portion of the wakeup logic arrangement is applied to the first set of storage elements to determine the readiness of instructions contained in the first set of storage elements, which include, in addition to instructions that have just moved into a head position of a respective queue, instructions that remain in the head position as a result of being stalled from a previous cycle.

17. The processor of claim 16, wherein:
the second portion of the wakeup logic arrangement is applied to the second set of storage elements, which stores the instructions that have just moved into the head position of a respective queue, without storing the instructions that remain in the head position as a result of being stalled from a previous cycle, to determine whether each instruction in the second set of storage elements is ready.

18. The processor of claim 17, wherein:
the first portion of the wakeup logic arrangement compares destination tags broadcast from the pipestage in which instructions are dispatched for execution.

19. The processor of claim 18, wherein:
the second portion of the wakeup logic arrangement compares destination tags broadcast from pipestages following the pipestage in which instructions are dispatched for execution, up to and including the pipestage immediately before execution.

20. The processor of claim 19 wherein:
for each instruction that has just moved into the head position of a respective queue, a readiness indicated by the first portion of the wakeup logic arrangement takes precedence over a readiness indicated by the second portion of the wakeup logic arrangement.

21. A computer-implemented method, comprising:
placing each sequence of a plurality of sequences of computer instructions being scheduled for execution in a computer processor into a separate queue;
storing a head instruction from each queue into a first set of storage elements of a first storage unit;
storing any instruction that has just moved into the head position of a respective queue into a second set of storage elements of the first storage unit;
determining whether the instructions in the first storage unit are ready, wherein the readiness of instructions in the first set of storage elements is determined using destination tags from producer instructions in an immediately preceding processor cycle, and wherein the readiness of instructions in the second set of elements is determined using destination tags from producer instructions in a plurality of cycles that are earlier than the immediately preceding processor cycle;
for each instruction in the first storage unit that is determined to be ready, moving the instruction from the first storage unit to a second storage unit in which the instruction is stored until selected for dispatch to an execution unit;
during a first processor cycle, for each instruction in the first set of storage elements that is determined to be not ready, retaining the instruction in the first set of storage elements and repeating the determining of whether the instruction is ready in the next processor cycle; and
applying scheduling logic to perform scheduling of instructions contained in the second storage unit, wherein the scheduling selects a subset of the instructions in the second storage unit for dispatch.

22. The method of claim 21, wherein the processor is a multi-strand out-of-order processor configured to execute each sequence of the plurality of sequences as a separate strand.

23. The method of claim 21, further comprising:
during each processor cycle, storing each head instruction into a corresponding storage element in the first set of storage elements and each instruction that has just moved into the head position of a respective queue into a corresponding storage element in the second set of storage elements; and
applying wakeup logic to the first storage unit to determine whether each instruction stored in the first storage unit is ready.

24. The method of claim 23, wherein:
the wakeup logic is split into a first portion associated with the first set of storage elements and a second portion associated with the second set of storage elements;
the first portion and the second portion each compare destination tags broadcast by producer instructions, including both single cycle as well as multi-cycle instructions; and
the first portion and the second portion collectively compare destination tags from different pipestages starting from a pipestage in which instructions are dispatched for execution up to and including a pipestage immediately before execution.

25. The method of claim 24, further comprising:
storing instructions that have just moved into a head position of a respective queue as well as instructions that remain in the head position as a result of being stalled from a previous cycle into the first set of storage elements; and
applying the first portion of the wakeup logic to the first set of storage elements to determine the readiness of instructions contained in the first set of storage elements.

26. The method of claim 25, further comprising:
storing the instructions that have just moved into the head position of a respective queue into the second set of storage elements, without storing the instructions that remain in the head position as a result of being stalled from a previous cycle; and
applying the second portion of the wakeup logic to the second set of storage elements to determine whether each instruction in the second set of storage elements is ready.

27. The method of claim 26, wherein:
the first portion of the wakeup logic compares destination tags broadcast from the pipestage in which instructions are dispatched for execution.

28. The method of claim 27, wherein:
the second portion of the wakeup logic compares destination tags broadcast from pipestages following the pipestage in which instructions are dispatched for execution, up to and including the pipestage immediately before execution.

29. The method of claim 28, wherein:
for each instruction that has just moved into the head position of a respective queue, a readiness indicated by the first portion of the wakeup logic takes precedence over a readiness indicated by the second portion of the wakeup logic.

30. The method of claim 24, wherein the first storage unit and the second storage unit are implemented using flops as storage elements, and the first portion of the wakeup logic and the second portion of the wakeup logic are implemented as content addressable memories.

* * * * *

UNITED STATES PATENT AND TRADEMARK OFFICE
CERTIFICATE OF CORRECTION

PATENT NO. : 9,645,819 B2  
APPLICATION NO. : 13/524240  
DATED : May 9, 2017  
INVENTOR(S) : Jayesh Iyer et al.

Page 1 of 1

It is certified that error appears in the above-identified patent and that said Letters Patent is hereby corrected as shown below:

On the Title Page

In item (75), in Column 1, in "Inventor", Line 2, delete "(IN);" and insert -- (RU); --, therefor.

In the Claims

In Column 12, Line 57, in Claim 3, after "each" delete "head".

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*